(12) United States Patent
Kitajima

(10) Patent No.: US 6,857,589 B2
(45) Date of Patent: Feb. 22, 2005

(54) FISHING REEL COMPONENT

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/703,521

(22) Filed: Nov. 10, 2003

(65) Prior Publication Data

US 2004/0104291 A1 Jun. 3, 2004

(30) Foreign Application Priority Data

Dec. 3, 2002 (JP) ........................................ 2002-351542

(51) Int. Cl.⁷ ............................................. A01K 89/01
(52) U.S. Cl. ....................................... 242/318; 242/322
(58) Field of Search ................................ 242/318, 322, 242/317, 312, 282, 283, 284

(56) References Cited

U.S. PATENT DOCUMENTS

| | | | | |
|---|---|---|---|---|
| 2,865,662 A | * | 12/1958 | Nurmse | ...................... 242/318 |
| 2,885,662 A | | 12/1958 | Nurmse | |
| 4,535,953 A | * | 8/1985 | Omori | ........................ 242/318 |
| 4,651,945 A | * | 3/1987 | Ruin | ........................... 242/318 |
| 5,078,334 A | * | 1/1992 | Zanon | ........................ 242/322 |
| 5,419,505 A | * | 5/1995 | Yoshikawa | ................... 242/322 |
| 5,456,418 A | * | 10/1995 | Hitomi | ........................ 242/322 |
| 5,573,193 A | * | 11/1996 | Bernard et al. | ............. 242/319 |
| 5,873,535 A | * | 2/1999 | Jeung | .......................... 242/314 |
| 6,655,622 B2 | * | 12/2003 | Kitajima et al. | ............ 242/322 |

FOREIGN PATENT DOCUMENTS

| | | |
|---|---|---|
| JP | 2000-166440 A | 6/2000 |
| JP | 2001-017038 A | 1/2001 |

* cited by examiner

*Primary Examiner*—Emmanuel Marcelo
(74) *Attorney, Agent, or Firm*—Shinjyu Global IP Counselors, LLP

(57) ABSTRACT

A spinning reel spool is detachable from a spool shaft having a tapered surface and an engagement groove. The spool includes a spool unit, an engagement spring, a positioning projection, a lid member, an operation button, and an engagement hole. The spool unit includes a circular mounting space. The positioning projection determines the rotational position of the engagement spring. The operation button is mounted in the lid member and can pass over the engagement groove. The operation button includes a pair of tapered portions that are disposed with the spool shaft therebetween such that the gap between the pair of engagement portions is widened by movement of the operation button in the axial direction. The engagement hole controls the rotational position of the operation button.

20 Claims, 9 Drawing Sheets

FISHING REEL COMPONENT

BACKGROUND OF THE INVENTION

1. Field of the Invention

The present invention generally relates to a fishing reel component. More specifically, the present invention relates to a fishing reel component detachable with one touch from a shaft member of a fishing reel, where the shaft member has having a tapered surface formed on its tip and an annular groove formed to the rear of the tapered surface.

2. Background Information

Fishing reel components that can be detached with one touch from a spool shaft (an example of a shaft member), are known in the prior art. An example of a fishing reel component is a spool for a spinning reel. For example Utility Model Application Publication No. H06-068447 discloses a fishing reel component that can be detached with one touch. Such conventional spool that is detachable with one touch is detachably mounted to a spool shaft, the spool shaft having a tapered surface formed on the tip thereof and an annular groove formed to the rear of the tapered surface.

The spool includes a spool unit, an engagement spring, a lid member, and an operation member. The spool unit includes a pass through portion through which a spool shaft passes, and a mounting space that is formed in an end surface of the spool unit through which a sprocket shaft passes. The engagement spring is disposed in the mounting space and is capable of engaging with the annular groove in the spool shaft. The lid member is mounted on the front portion of the spool unit and serves to retain the engagement spring in the mounting space. The operation member serves to disengage the engagement spring from the annular groove.

The mounting space is a circular space concentrically disposed around the pass through portion. The engagement spring is a member formed by bending a resilient wire member. The engagement spring includes a pair of engagement portions that are formed opposite one another so that they engage with the annular groove, and a C-shaped connecting portion that connects one end of one of the engagement portions and, wraps around and connects with one end of the other of the engagement portions. The engagement spring engages with the annular groove, and urges the operation member in a direction opposite to that in which the operation member is pushed.

The operation member is mounted on the outer peripheral side of the spool shaft, and is mounted in the mounting space such that it is moveable forward and backward and such that it can pass over the annular groove. The operation member includes a pair of tapered portions, which are mounted between the engagement portions and formed on one end of the operation member such that the gap between the pair of engagement portions is widened by movement of the operation member in the axial direction, and a push operation portion member that is exposed to the exterior of the spinning reel in the center of the lid member. The engagement between the annular groove of the shaft member and the engagement spring is released by pushing on the push operation portion member. The pair of tapered portions has an inner diameter that is larger than that of the spool shaft, and tapered surfaces on its outer peripheral portions. The pair of tapered portions is disposed such that the spool shaft is interposed therebetween when mounted. The tips of the tapered portions are inserted between the pair of engagement portions in a state in which they are urged by the engagement spring. The lid member is fixedly coupled to the spool unit by screws, for example, and also retains the operation member on the spinning reel.

By pushing the operation member toward the spool shaft, the gap between the engagement portions of the engagement spring will widen due to the tapered portions being released from the engagement with the spool shaft, and the spool can then be detached. In this state, the spool can be detached from the spool shaft. In addition, when the engagement portions are spread apart by the tapered portions of the operation member, the push operation portion is urged in a direction opposite to that in which the push operation portion is pushed because the engagement portions urge the tapered portions of the operation member in a direction which pushes the tapered portions toward each other. Given this structure, when the push operation is stopped, the operation member will move in the opposite direction, and the pair of engagement portions will return to a state in which each can engage with the spool shaft.

When the spool is mounted to the spool shaft, the engagement portions of the engagement spring are spread apart by the tapered surface of the spool shaft. When the engagement spring is positioned in the annular groove, the engagement portions engage the annular groove to retain thereby the spool on the spool shaft.

When this type of spool is assembled, the engagement spring is positioned in the mounting space, and the lid member is screwed to the spool unit with the ends of the tapered portions of the operation member inserted between the pair of engagement portions of the engagement spring.

In the conventional spool detachable with one touch noted above, the operation member and the engagement spring can be mounted in the mounting space at any rotational position. Given this structure, there is a possibility that the pair of tapered portions of the operation member can be inadvertently inserted into the outer sides of the pair of engagement portions during assembly. When the tapered portions are inserted into the outer sides of the pair of engagement portions of the engagement spring, the gap between the engagement portions of the engagement spring cannot be widened, even if the operation member is pushed. Thus, in the conventional structure, one must be careful not to assemble incorrectly the operation member with the engagement spring while mounting the operation member.

In view of the above, it will be apparent to those skilled in the art from this disclosure that there exists a need for an improved fishing reel component. This invention addresses this need in the art as well as other needs, which will become apparent to those skilled in the art from this disclosure.

SUMMARY OF THE INVENTION

An object of the present invention is to prevent errors in the assembly of the operation member to the engagement spring in fishing reel components that are capable of being detached from a shaft member with one touch.

A fishing reel component according to a first aspect of the present invention is a one-touch detachable fishing reel component for use in a fishing reel that has a shaft member having a tapered shaft surface formed on a tip of the shaft member, and an annular groove formed adjacent to the tapered shaft surface. The fishing reel component includes a component unit, an engagement spring, first positioning means, a lid member, an operation member, and second positioning means. The component unit includes a pass through portion through which the shaft member passes, and a circular mounting space that is formed in a front surface of the component unit through which the shaft member passes and which is concentric with the pass through portion. The engagement spring is made of a resilient member and is mounted in the mounting space. The engagement spring includes a pair of engagement portions that are disposed opposite each other such that they engage with the annular groove, and a C-shaped connecting portion that connects with one end of one engagement portion and wraps around and connects to one end of another engagement portion. The first positioning means positions the engagement spring within the circular mounting space, and can be disposed in the mounting space. The lid member is configured to be fixedly coupled to the component unit such that the lid member covers the mounting space in order to retain the engagement spring in the mounting space. The operation member is configured to be mounted on the lid member so that the operation member is axially movable therewith and can pass over the annular groove of the shaft member, and includes a push operation portion and a pair of tapered portions. The push operation portion is exposed to the exterior of the reel in the center of the lid member. The pair of tapered portions projects from the push operation portion, and the tips of the pair of tapered portions are inserted in between the engagement portions. Further, the pair of tapered portions is disposed within the mounting space with the shaft member interposed therebetween so that the gap between the pair of engagement portions is configured to widen as the tapered portions are inserted between the engagement portions due to the movement of the operation member in the axial direction to release the engagement between the annular groove and the engagement spring. The operation member serves to release the engagement between the annular groove of the shaft member and the engagement spring by pushing on the push operation member. The second positioning means controls the rotational position of the operation member relative to the engagement spring so that the tips of the pair of tapered portions of the operation member are disposed between the engagement portions of the engagement spring.

In this fishing reel component, the engagement spring is disposed during assembly in a state in which the rotation position thereof is determined in the mounting space by means of the first positioning means. Then, the operation member is placed in the mounting space from the tapered portions side thereof. When this occurs, the rotational position of the operation member is controlled by the second positioning means so that the tapered portions are disposed between the engagement portions. Here, the operation member and the engagement spring can only be mounted in a positioned state in the mounting space because the rotational position of the engagement spring is determined by the first positioning means, and because the rotational position of the operation member is determined such that the tapered portions thereof are disposed between the engagement portions when the operation member is mounted. Given this structure, errors in the assembly of the operation member with the engagement spring can be prevented.

The fishing reel component according to a second aspect of the present invention is the component described in the first aspect, in which the tapered portions of the operation member have a tapered surface on its outer peripheral surface and an inner diameter that is larger than a diameter of the shaft member. Here, even if the operation member is made by die casting, the tapered portions that have the shaft member interposed therebetween will be easy to design.

The fishing reel component according to a third aspect of the present invention is the component described in the first aspect, in which the first positioning means includes a positioning projection that is provided on a bottom portion of the mounting space, and is formed in between both engagement portions of the engagement spring. Here, the pair of engagement portions can be used to position easily the rotational position of the engagement spring by simply disposing the engagement spring on the bottom portion of the mounting space such that the positioning projection is disposed between the pair of engagement portions.

The fishing reel component according to a fourth aspect of the present invention is the component described in any of the first to third aspects, in which the second positioning means includes a non-circular engagement hole, which includes a pair of arc-shaped portions and a pair of connecting portions. The arc-shaped portions have inner diameters that are slightly larger than the outer diameter of the tapered portions, and are disposed opposite the tapered portions. The pair of connecting portions each connects both ends of the arc-shaped portions along the engagement portions of the engagement spring positioned by the positioning projection. The connecting portions are spaced apart from each other by a gap that is slightly smaller than the outer diameter of the tapered portions. Here, since the gap between the connecting portions is smaller than the outer diameter of the tapered portions, the operation member can be mounted in the engagement hole only when the tapered members are opposite the arc-shaped portions and cannot be mounted in the engagement hole when the tapered portions are opposite the connecting portions. Since the connecting portions of the engagement hole are disposed along the engagement portions, the tapered portions can be reliably inserted in between the engagement portions of the engagement spring positioned by the first positioning means, and thus, errors in the assembly of both components can be prevented with a simple structure.

The fishing reel component according to a fifth aspect of the present invention is the component described in the fourth aspect, in which the engagement hole is formed within the mounting space on the front surface of the component unit.

The fishing reel component according to a sixth aspect of the present invention is the component according to the fourth aspect, and further includes a washer member configured to be mounted in between the bottom portion of the mounting space and the engagement spring.

The fishing reel component according to a seventh aspect of the present invention is the component according to the sixth aspect, in which the engagement hole is formed in a central portion of the washer member. Here, since the gap between the connecting portions is smaller than the outer diameter of the tubular portions, the operation member can be mounted in the engagement hole only when the tapered members are opposite the arc-shaped portions and cannot be mounted in the engagement hole when the tapered portions are opposite the connecting portions. Since the connecting portions of the engagement hole are disposed along the engagement portions, the tapered portions can be reliably inserted in between the engagement portions of the engagement spring positioned by the first positioning means, and thus, errors in the assembly of both components can be prevented with a washer member that is provided separately from the component unit.

The fishing reel component according to an eighth aspect of the present invention is the component according to the seventh aspect, in which the washer member has a cut-out portion that allows the first positioning means to pass therethrough. Here, a washer member that adjusts the axial position of the component unit can be easily disposed even if the positioning projection is provided.

The fishing reel component according to a ninth aspect of the present invention is the component described in the sixth or seventh aspect, in which the first positioning means includes a positioning projection that is formed on the washer member and configured to be disposed between the engagement portions of the engagement spring. Here, the engagement spring can be positioned without adding modifications to the component unit because the component unit can position the rotational position of the engagement spring with a separate washer member.

The fishing reel component according to a tenth aspect of the present invention is the component described in any of the first to ninth aspects, in which the shaft member is a spool shaft that is mounted on the reel unit of the spinning reel so that the spool shaft is movable forward and backward, and the component unit is a spool unit of the spinning reel that is detachably and non-rotatably mounted to the spool shaft and has fishing line wound around the outer periphery of the spool unit. Here, errors in the assembly of the components of the spinning reel spool can be prevented.

The fishing reel component according to an eleventh aspect of the present invention is the component described in any of the first to ninth aspects, in which the shaft member is a knob shaft that is fixed to a tip of a handle arm of a dual bearing reel. Further, the component unit is a knob unit that is rotatably and detachably mounted to a handle shaft. Here, errors in the assembly of the components of the handle knob of the dual bearing reel can be prevented.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
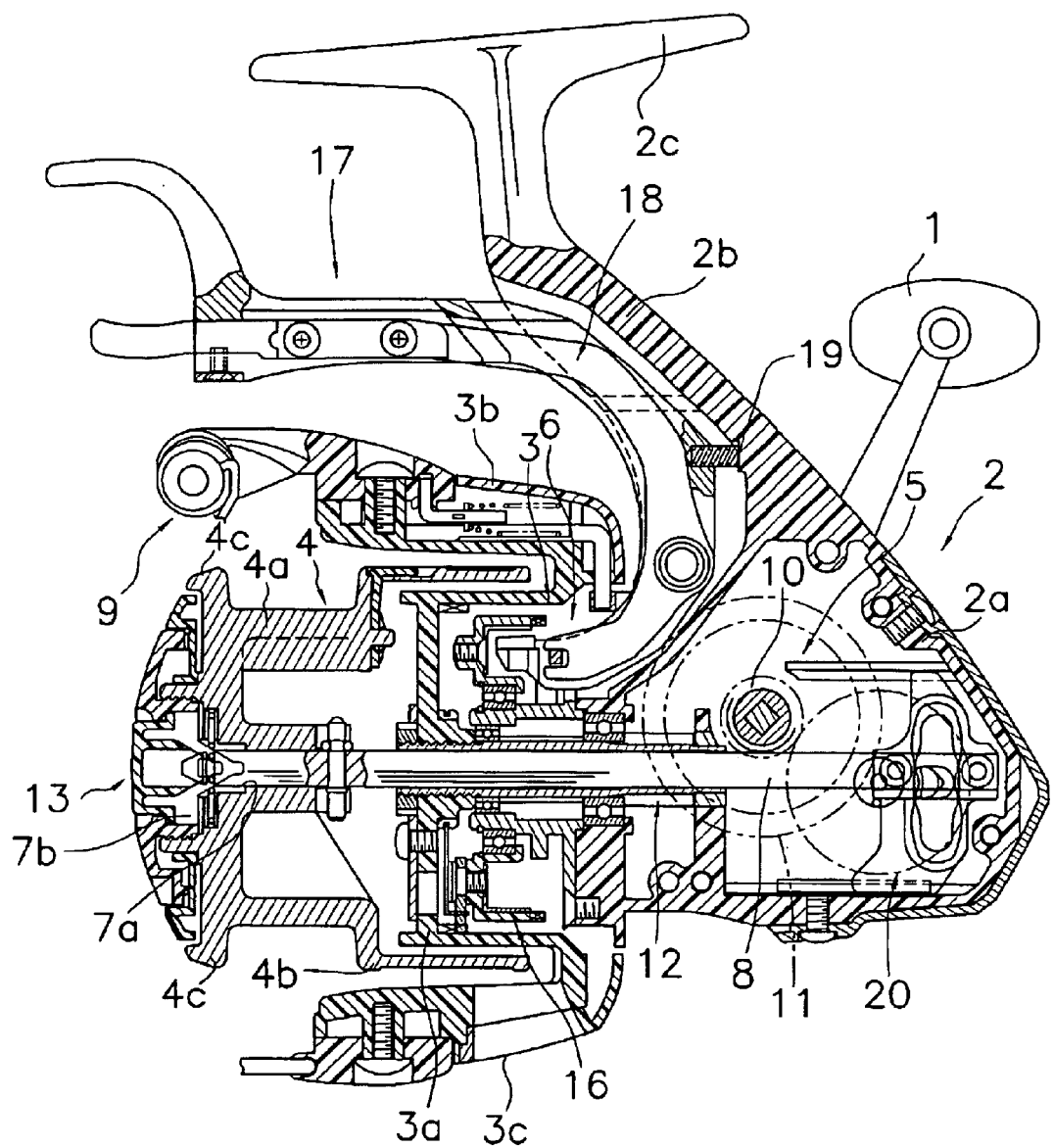
FIG. 1 is a lateral cross-sectional view of a spinning reel according to a first embodiment of the present invention.

As shown in FIG. 1, a spinning reel according to a first embodiment of the present invention is a lever brake type of reel which rotates and winds fishing line in a direction that is longitudinal to the fishing rod. The spinning reel includes a reel unit 2 that includes a handle 1, a rotor 3 that is rotatably supported on a front portion of the reel unit 2, and a spool 4 that is disposed on the front portion of the rotor 3 and around which fishing line is wound.

As shown in FIG. 1, the reel unit 2 is, for example, composed of a synthetic resin. The reel unit 2 includes an attachment portion 2c, a reel body 2a, and a leg portion 2b. The attachment portion 2c extends from the front to the rear of the reel unit 2 and is to be mounted to the fishing rod. The reel body 2a is disposed with a gap between the reel body 2a and the attachment portion 2c and includes a mechanism accommodation space in the interior of the reel body 2a. The leg portion 2b links the attachment portion 2c with the reel body 2a. The handle 1 may be mounted on either the right side or the left side of the reel body 2a.

A rotor drive mechanism 5, a lever brake mechanism 6, and an oscillating mechanism 20 are provided in the reel body 2a. The rotor drive mechanism 5 serves to rotate the rotor 3; the lever brake mechanism 6 serves to control the rotation of the rotor 3 in the line releasing direction; and the oscillating mechanism 20 reciprocally moves the spool 4 forward and backward along a spool shaft 8.

The rotor 3 is, for example, made of a synthetic resin or metal, and is rotatably supported by the reel unit 2. The rotor 3 includes a cylindrical portion 3a, and a first arm 3b and second arm 3b which are arranged opposite each other on the sides of the cylindrical portion 3a. A pivotable bail arm 9 is provided between the tip of the first arm 3b and the tip of the second arm 3c. Fishing line is guided onto the spool 4 by the bail arm 9. Since rotor, rotor drive mechanism, lever brake mechanism, and oscillating mechanism are well-known components in the art, these components will not be described or shown in any further detail herein.

Figure 2:
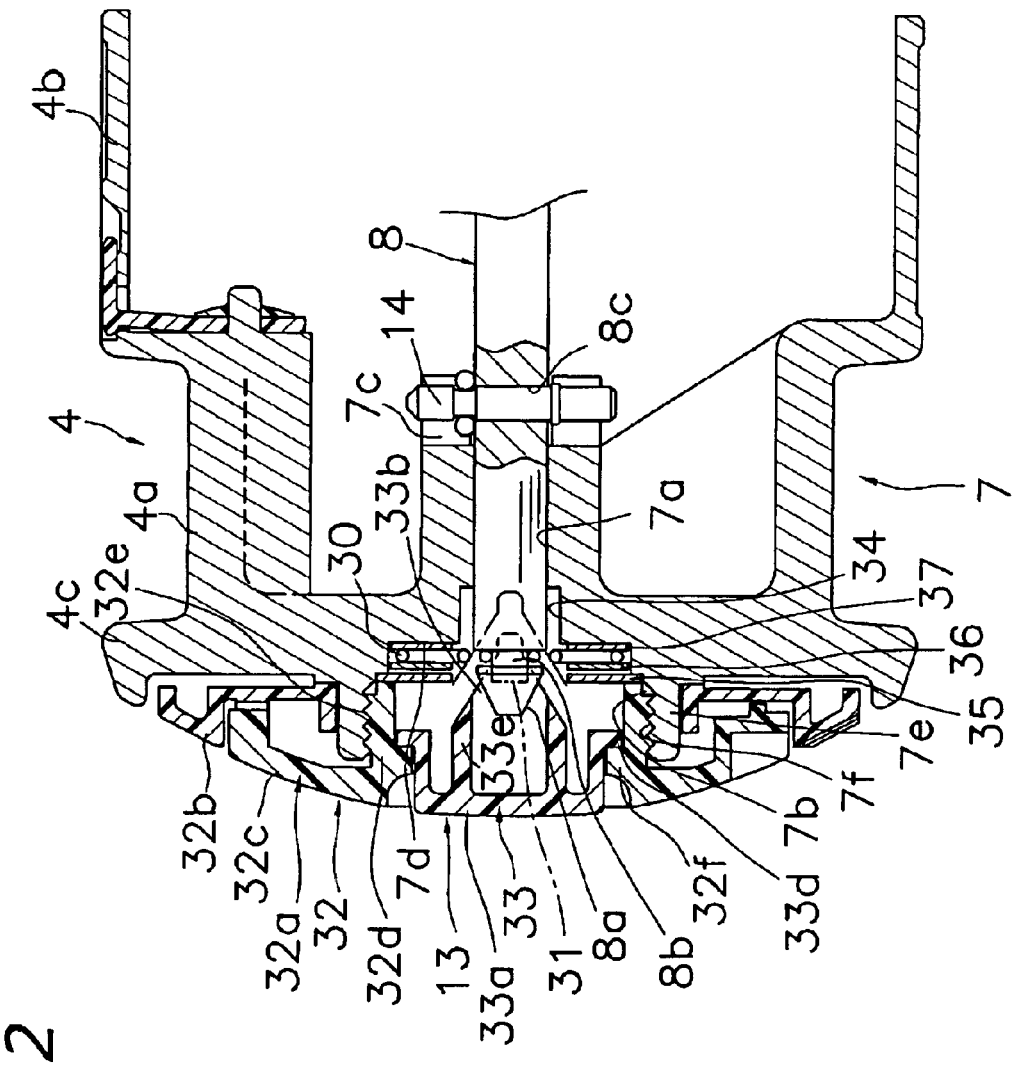
FIG. 2 is a cross-sectional view of the spool in accordance with the first embodiment of the present invention shown in FIG. 1.

As shown in FIG. 1, the spool 4 is disposed between the first arm 3b and the second arm 3c of the rotor 3. The spool 4 is non-rotatably mounted on the tip of the spool shaft 8, and may be detached therefrom with one touch. As shown in FIG. 2, the spool shaft 8 includes a tapered surface 8a that is formed on the tip of the spool shaft 8, and an annular engagement groove 8b that is formed to the rear of the tapered surface 8a (the right side in FIG. 2).

The spool 4 includes a spool unit 7 and a one-touch removal mechanism 13. The spool unit 7 includes a line winding cylinder 4a, a tubular skirt 4b, and a front flange 4c. The fishing line is wound around the outer periphery of the line winding cylinder 4a. The tubular skirt 4b is formed integrally on the rear of the line winding cylinder 4a. The front flange 4c is formed on the front part of the line winding cylinder 4a. The front flange 4c has a diameter that is larger than the diameter of the line winding cylinder 4a. The spool unit 7 is, for example, made of a metal such as an aluminum alloy, a magnesium alloy, or a stainless steel alloy, or a synthetic resin such as polyamide synthetic resin.

A through hole 7a (an example of pas through portion) through which the spool shaft 8 passes is formed in the center of the spool unit 7. In addition, a tubular projection 7e that is concentric with the through hole 7a is formed in the front surface of the spool unit 7 through which the spool shaft 8 passes, and a mounting space 7b for mounting the one-touch removal mechanism 13 is formed inside the projection 7e. A female-threaded portion 7f for mounting a lid member 32 (described below) is formed in the inner peripheral surface of the projection 7e. A rotation stop groove 7c is formed along the radial direction in a rear end portion of the through hole 7a. A rotation stop pin 14 is mounted in a pin hole 8c formed along the radial direction in the spool shaft 8. Further, the rotation stop pin 14 is engaged with the rotation stop groove 7c. The spool 4 is made non-rotatable with respect to the spool shaft 8 by engaging the rotation stop pin 14 with the rotation stop groove 7c.

Figure 3:
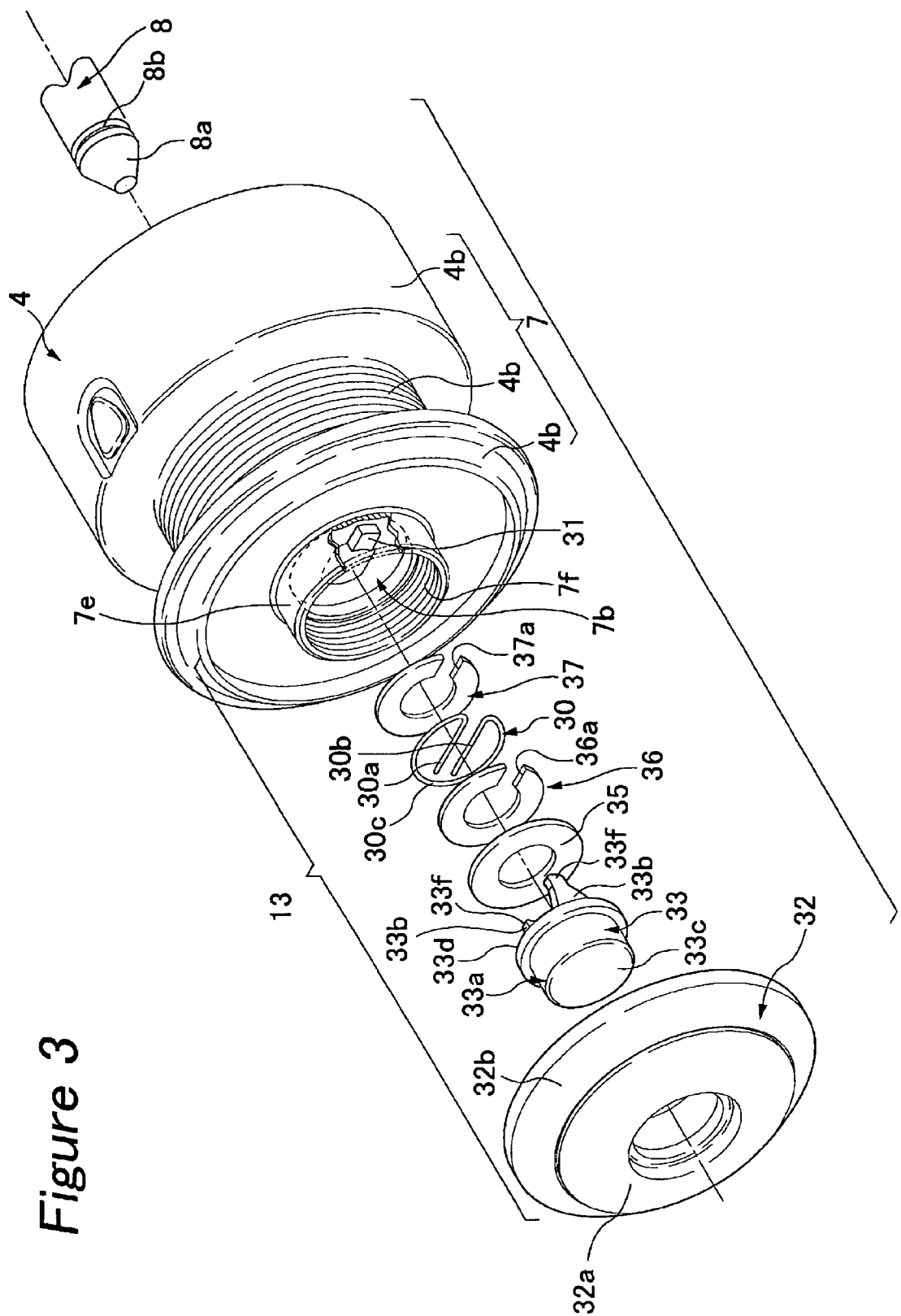
FIG. 3 is an exploded perspective view of the spool in accordance with the first embodiment of the present invention.
Figure 4:
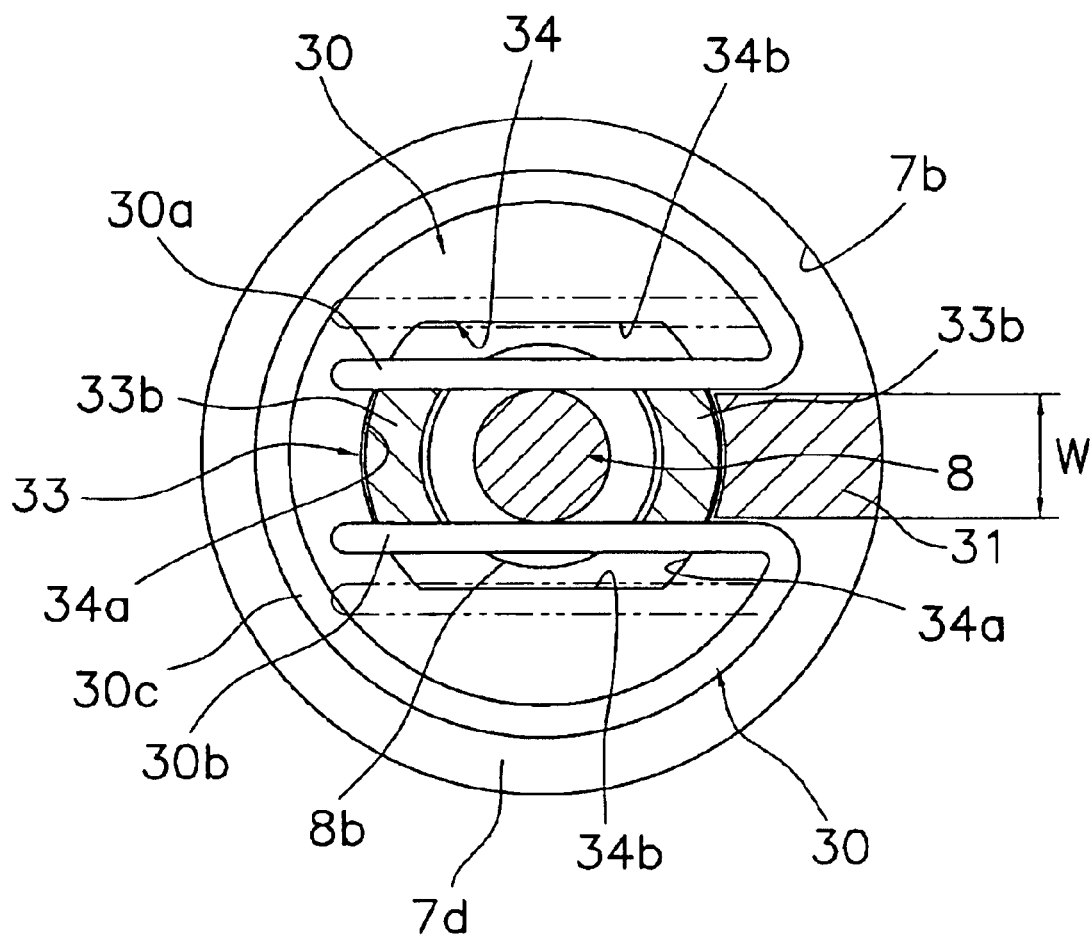
FIG. 4 is an enlarged front view of an engagement spring in accordance with the first embodiment of the present invention in the attached state with certain components shown in a cross-sectional view.

As shown in FIGS. 2 to 4, the one-touch removal mechanism 13 includes an engagement spring 30, a positioning projection 31, a lid member 32, an operation button 33, an engagement hole 34, and three washers 35–37. The engagement spring 30 is made from a resilient wire material and engages with the engagement groove 8b of the spool shaft 8. The positioning projection 31 serves as the first positioning means for determining the rotational position of the spool shaft 8; and the engagement hole 34 serves as the second positioning means.

The engagement spring 30 serves to mount the spool 4 to the spool shaft 8 so that the spool 4 is not movable in the axial direction relative to the spool shaft 8. In addition, the engagement spring 30 also functions to urge the operation button 33 forward. The engagement spring 30 is formed by bending a resilient wire, such that the urging force of the engagement spring 30 is produced when the engagement spring 30 is deformed. The engagement spring 30 includes a pair of straight engagement portions 30a and 30b, and a C-shaped connecting portion 30c. The engagement portions 30a and 30b are disposed opposite each other to engage with the engagement groove 8b. The engagement portions 30a and 30b are preferably substantially parallel to each other. The C-shaped connecting portion 30c is connected to one end of the engagement portion 30a and wraps around and is connected to one end of the engagement portion 30b. The engagement spring 30 is mounted in the mounting space 7b.

The positioning projection 31 is provided on a rear or bottom portion 7d of the mounting space 7b, and projects forward such that it is disposed between both engagement portions 30a and 30b of the engagement spring 30. As shown in FIG. 4, a width W of the positioning projection 31 is slightly smaller than the gap between the engagement portions 30a and 30b. More specifically, the width W is preferably between 85% and 99% of the gap between the engagement portions 30a and 30b. In addition, the height of the positioning projection 31 is either the same as or smaller than the depth of the mounting space 7b. More specifically, the height of the positioning projection 31 is preferably 50% to 100% of the depth of the mounting space 7b. The rotational position of the engagement spring 30 can be determined by interposing the positioning projection 31 between both engagement portions 30a and 30b and mounting the engagement spring 30 in the mounting space 7b.

Referring again to FIGS. 2 to 4, the lid member 32 is an approximately disk shaped member preferably made from a synthetic resin, and is screwed to the projection 7e of the spool unit 7 so as to cover the mounting space 7b and retain the engagement spring 30 in the mounting space 7b. The lid member 32 includes a lid unit 32a, and a fishing line size display 32b that is rotatably mounted on the lid unit 32a. The lid unit 32a includes a ring shaped disk 32c that extends forward in a convex shape, and a tubular fixing portion 32d that projects rearward from the center of the disk 32c. A threaded portion 32e that threadedly engages with the threaded portion 7f of the projection 7e is formed on the outer periphery of the fixing portion 32d. In addition, an engagement ring 32f that projects radially inward is formed on the inner peripheral surface of the fixing portion 32d. The engagement ring 32f is provided in order to retain the operation button 33. The fishing line size display 32b has, for example, engraved marks that can be matched with fishing line sizes drawn on the lid unit 32a. The size of the fishing line wound around the spool 4 can be indicated by matching the mark with the fishing line size on the lid unit 32a.

The operation button 33 has a length that is capable of passing over the engagement groove 8b of the spool shaft 8, and serves to release the engagement spring 30 from the engagement groove 8b by pushing down on the operation button 33. The operation button 33 includes a push operation portion 33a that is movable in the axial direction and mounted on the lid member 32, and a pair of tapered portions 33b that project rearward from the push operation portion 33a. The push operation portion 33a includes a closed-end tubular button portion 33c whose front portion is exposed through a center bore of the lid member 32, and a ring shaped projection 33d that projects radially outward from the outer periphery of the button portion 33c. The outer surface of the closed-end tubular button 33c projects slightly outward from the lid member 32. The ring shaped projection 33d is engaged with the engagement ring 32f of the lid member 32a, and thereby retains the operation button 33.

Figure 5:
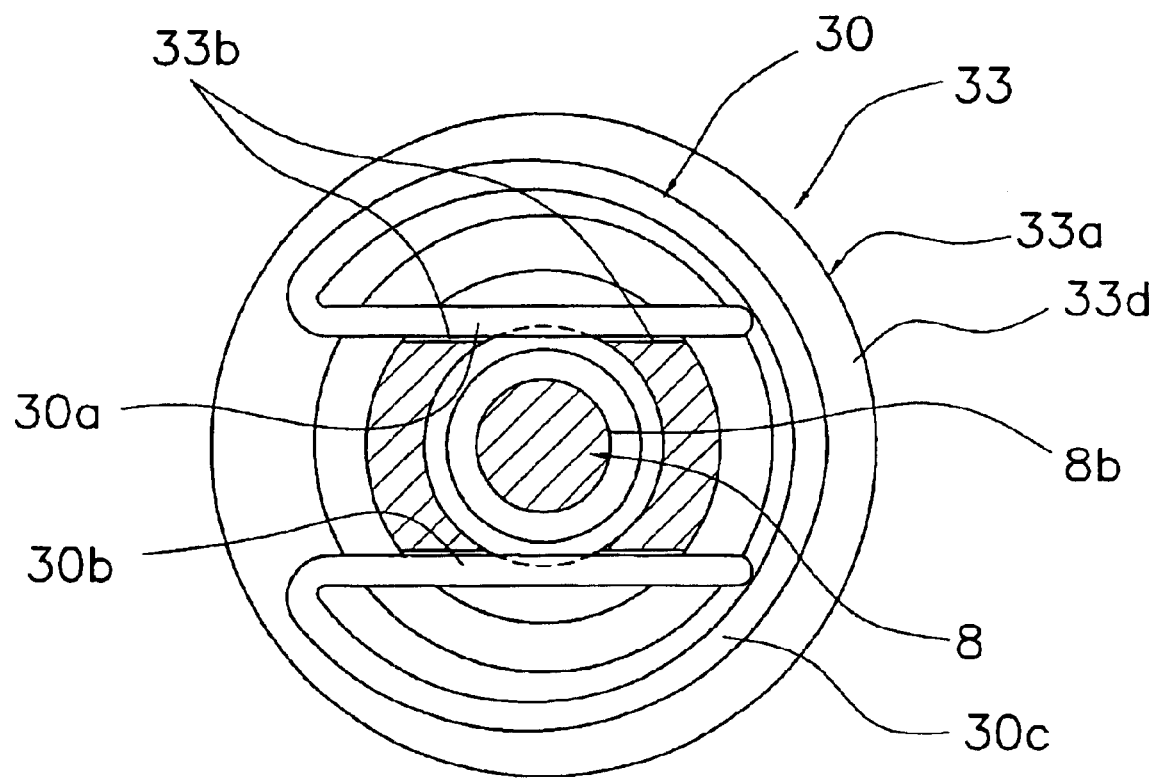
FIG. 5 is a cross sectional view of the tapered portion of the operation member in accordance with the first embodiment of the present invention, as viewed from the line V—V in FIG. 2.

The tapered portions 33b are formed on the end (the right end in FIG. 2) of a tubular portion 33e that projects rearward from the rear surface of the button portion 33c of the operation button 33. The tubular portion 33e has an inner diameter that is slightly larger than the spool shaft 8. Tapered portions 33b are formed at a rear end of the tubular portion 33e, and taper off in a direction away from the tubular portion 33e. The tapered portions 33b have tapered surfaces 33b" formed on their outer peripheral surfaces. As seen in FIG. 5, each of the tapered portions 33 is arc-shaped in cross section, with the end faces of the arc-shaped portion 33b' being the tapered surfaces 33b". The tips of the pair of tapered portions 33b are inserted between the pair of engagement portions 30a and 30b, and the spool shaft 8 is interposed between the pair of tapered portions 33b such that the space between the engagement portions 30a and 30b will widen due to movement in the axial direction. Note that flat portions 33f are formed on the ends of the tapered portions 33b. The flat portions 33f are formed in order to insert reliably the tapered portions 33b into the engagement portions 30a and 30b. When the operation button 33 is not being pushed, the engagement portions 30a and 30b of the engagement spring 30 are in contact with the tapered portions 33b slightly forward of the flat portions 33f. Note that the engagement spring 30 urges the operation button 33 forward via the tapered portions 33b when the engagement portions 30a and 30b of the engagement spring 30 are spread apart by inserting the tapered portions 33b rearward and in between the engagement portions 30a and 30b. Given this structure, the ring-shaped projection 33d of the operation button 33 is in contact with the engagement ring 32f of the lid member 32 when the operation button 33 is not being pushed, and the operation button 33 is thereby retained.

The engagement hole 34 controls the rotational position of the operation button 33 so that the ends of the pair of tapered portions 33b are disposed between the engagement portions 30a and 30b of the engagement spring 30. As shown in FIG. 2, the engagement hole 34 is formed in the rearward or bottom portion 7d of the mounting space 7b. As seen in FIG. 4, the engagement hole 34 is formed with an approximately oval shape in the bottom portion 7d of the mounting space 7b. A cross section of the engagement hole 34 perpendicular to the spool shaft 8 preferably includes a pair of arc-shaped portions 34a and a pair of connecting port Referring again to FIGS. 2 to 4, the pair of arc-shaped portions 34a has inner diameters that are slightly larger than the outer diameter of the tubular portion 33e of the tapered portions 33b. The arc-shaped portions 34a are disposed opposite the tapered portions 33b. The pair of connecting portions 34b each connects both ends of the arc-shaped portions 34a along the engagement portions 30a and 30b of the engagement spring 30 positioned by the positioning projection 31. The connecting portions 34b are spaced apart from each other by a gap that is slightly smaller than the outer diameter of the tubular portion 33e. More specifically, the inner diameters of the arc-shaped portions 34a are 101% to 110% of the outer diameter of the tubular portion 33e, and the gap between the connecting portions 34b is 60% to 90% of the outer diameter of the tubular portion 33e. The positioning projection 31 is formed next to one of the pair of the arc-shaped portions 34a.

The three washers 35–37 are preferably made of metal. Further, the washers 36 and 37 serve to regulate the axial position of the spool 4. The washer 35 has a diameter that is larger than those of the washers 36 and 37, and is mounted on the front surface of the mounting space 7b. The washers 36 and 37 are disposed inside the mounting space 7b with the engagement spring 30 interposed therebetween. As shown in FIG. 3, cut-out portions 36a and 37a that allow the positioning projection 31 to pass therethrough are respectively formed in the washers 36 and 37 mounted in the mounting space 7b in order to avoid interference with the positioning projection 31.

As shown in FIG. 1, the rotor driving mechanism 5 includes a master gear 11 that rotates together with the handle shaft 10 to which the handle 1 is fixed, and a pinion gear 12 that meshes with the master gear 11. The spool shaft 10 is rotatably supported by the reel unit 2. The pinion gear 12 is formed into a tube shape, and the front portion thereof passes through the rotor 3 and extends toward the spool 4.

The lever brake mechanism 6 includes a brake portion 16, a brake lever 17, an auxiliary lever 17, and a coil spring 19. The brake lever 17 regulates the braking force of the brake portion 16. The auxiliary lever 17 operates the brake portion 16 in a predetermined brake state. The coil spring 19 urges the brake lever 17 away from the attachment portion 2c.

Referring to FIGS. 2 to 4, in the spinning reel described above, the push operation portion 33a of the operation button 33 will be pushed toward the spool shaft 8 when the spool 4 is to be removed. Thus, the tapered portions 33b will expand the gap between the engagement portions 30a and 30b of the engagement spring 30 to release the engagement with the engagement groove 8 of the spool shaft 8, thereby allowing the spool 4 to be removed. In this state, the spool 4 can be removed from the spool shaft 8 when the spool 4 is pulled forward. In addition, when the engagement portions 30a and 30b are spread apart by the tapered portions 33b, the pair of engagement portions 30a and 30b will apply force to the tapered portions 33b such that the tapered portions 33b are pushed toward each other. Thus, the push control portion 33a will be urged forward (toward the left in FIG. 2), i.e., the direction opposite the direction in which the operation button 33 is pushed. Given this structure, when the push operation is stopped, the operation button 33 will move forward and the pair of engagement portions will return to a state in which they can engage with the spool shaft 8.

When the spool 4 is to be mounted on the spool shaft 8, the engagement portions 30a and 30b of the engagement spring 30 are spread apart by the tapered surface 8a of the spool shaft 8, the engagement spring 30 is positioned in the engagement groove 8b, and the engagement portions 30a and 30b engage the engagement groove 8b due to their resiliency to retain thereby the spool 4 on the spool shaft 8.

When assembling the spool 4 of the spinning reel described above, the washer 37 is mounted onto the bottom portion 7d of the mounting space 7b, and the engagement spring 30 is then mounted in the mounting space 7b, such that the washer 37 is mounted between the bottom portion 7d and the engagement spring 30. At this time, the positioning projection 31 is positioned in the cut-out portion 37a and between the engagement portions 30a and 30b. This determines the rotational portion of the engagement spring 30. Then, the washers 36 and 35 are mounted in this order. Here as well, the positioning projection 31 is disposed so that it projects through the cut-out portion 36a. Then, the operation button 33 is mounted from the tapered portions 33b. At this time, since the gap between the connecting portion 34b of the engagement hole 34 is smaller than the diameter of the tubular portions 33e formed at the ends of the tapered portions 33b, the tapered portions 33b can only be inserted into the arc-shaped portions 34a, because the tubular portion 33e, which have the same outer diameter as that of the tapered portion 33b, cannot be inserted into the connecting portions 34b. When the tapered portions 33b are inserted into the arc-shaped portions 34a, the tapered portions 33b will be inserted between the engagement portions 30a and 30b of the engagement spring 30 because the positioning projection 31 is formed next to one of the arc-shaped portions 34a. As a result, errors in the assembly of the operation button 33 with the engagement spring 30 can be easily prevented because the rotational portions of the operation button 33 and the engagement spring are controlled so that the tapered portions 33b are inserted between the engagement portions 30a and 30b.

Here, the rotational position of the operation button 33 is controlled by means of the engagement hole 34 such that the tapered portions 33b are disposed between the engagement portions 30a and 30b of the positioned engagement spring 30. Due to this structure, the rotational positions of the engagement spring 30 and the operation button 33 are controlled such that the tapered portions 33b are disposed between the engagement portions 30a and 30b, and errors in the assembly of the operation button 33 with the engagement spring 30 can be prevented.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 6:
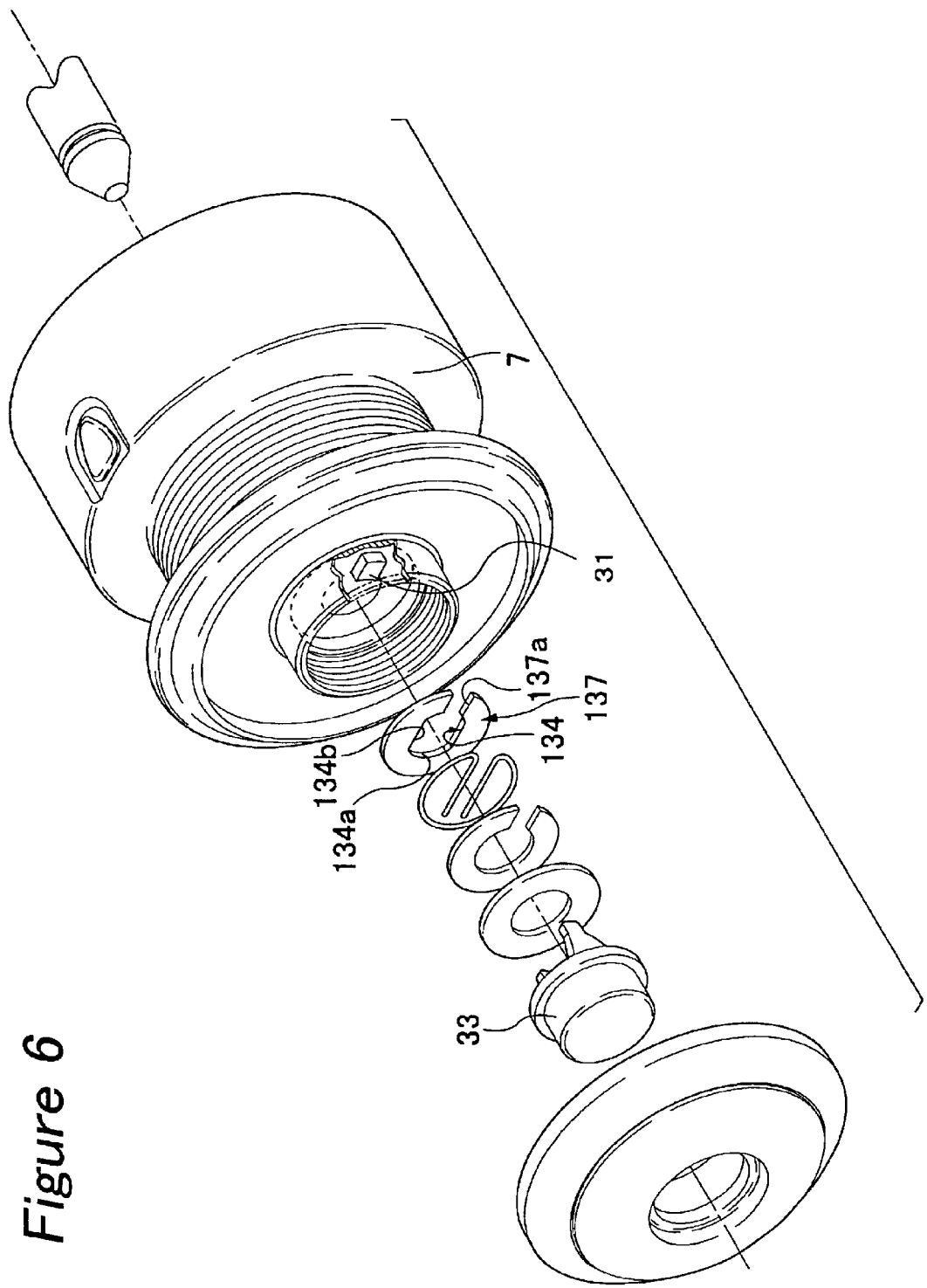
FIG. 6 is an exploded perspective view corresponding to FIG. 3 of a spool in accordance with a second embodiment of the present invention.

(a) As shown in FIG. 4, in the aforementioned embodiment, the engagement hole 34 was formed as a second positioning means in the bottom portion 7d of the mounting space 7b of the spool unit 7. However, the second positioning means may take any form so long as the rotational position of the operation button 33 is controlled. For instance, as shown in FIG. 6, the spool unit includes a washer 137, and an engagement hole 134 may be formed in the central portion of the washer 137 to control the rotational position of the operation button 33. The cross section of the engagement hole 134 that is perpendicular to the spool shaft 8 includes arc-shaped portions 134a and connecting portions 134b. The washer 137 has a cut-out portion 137a that is formed on one of the arc-shaped portions 134a, such that the positioning projection 31 passes therethrough. The connecting portions 134b are preferably substantially straight. Note that in FIGS. 5 and 6, the members that do not have reference numerals associated therewith are identical or substantially identical to the members shown in FIG. 3.

Figure 7:
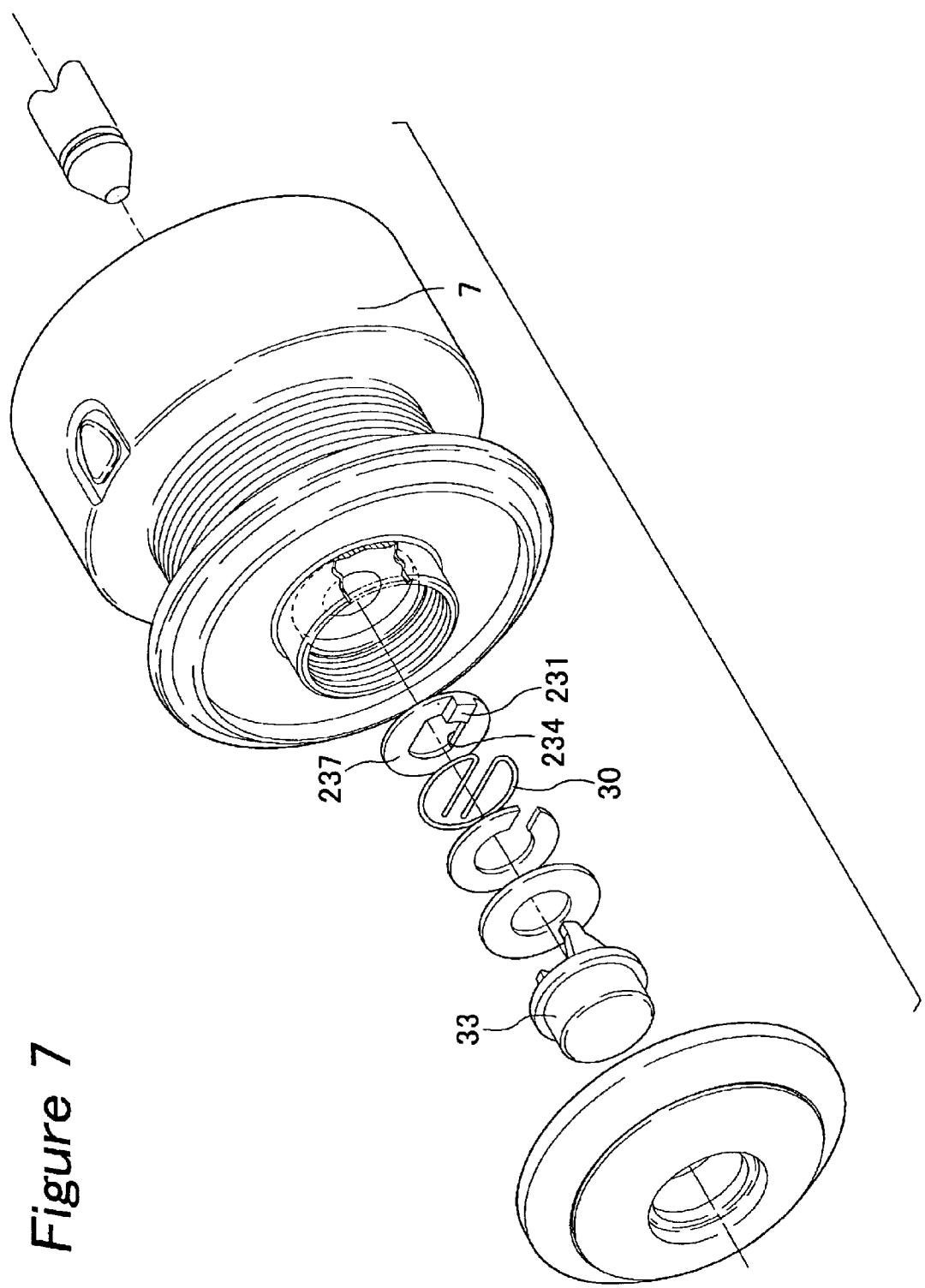
FIG. 7 is an exploded perspective view corresponding to FIG. 3 of a spool in accordance with a third embodiment of the present invention.

(b) As seen in FIG. 3, in the aforementioned first embodiment, the positioning projection 31 was formed as a first positioning means in the bottom portion 7d of the mounting space 7b of the spool unit 7. However, the first positioning means may take any form so long as it determines the rotational portions of the engagement spring 30. As shown in FIG. 7, the spool unit 7 has a washer 237, and a positioning projection 231 may be formed on the washer 237 by the engagement hole 234 to control the rotational position of the engagement spring 30. This positioning projection 231 is also disposed between the pair of engagement portions 30a and 30b of the engagement spring 30. In addition, the engagement hole 234 that was disclosed in (a) above as a second positioning means is also formed on the washer 237. With this configuration, one washer 237 can position the rotational positions of both the engagement spring 30 and the operation button 33.

(c) In the aforementioned embodiment, a spool for a lever brake type of spinning reel was used as an example of a fishing reel component. However, the present invention is not limited thereto, and may be applied to all fishing reel components that are detachable with one touch from a shaft member. For example, the present invention can be applied to all spinning reels in which the spool is non-rotatably mounted to the spool shaft, such as a rear drag type of spinning reel. In addition, as shown in FIGS. 7 and 8, the present invention can also be applied, for example, to a detachment structure for a handle knob on a dual bearing reel.

Figure 8:
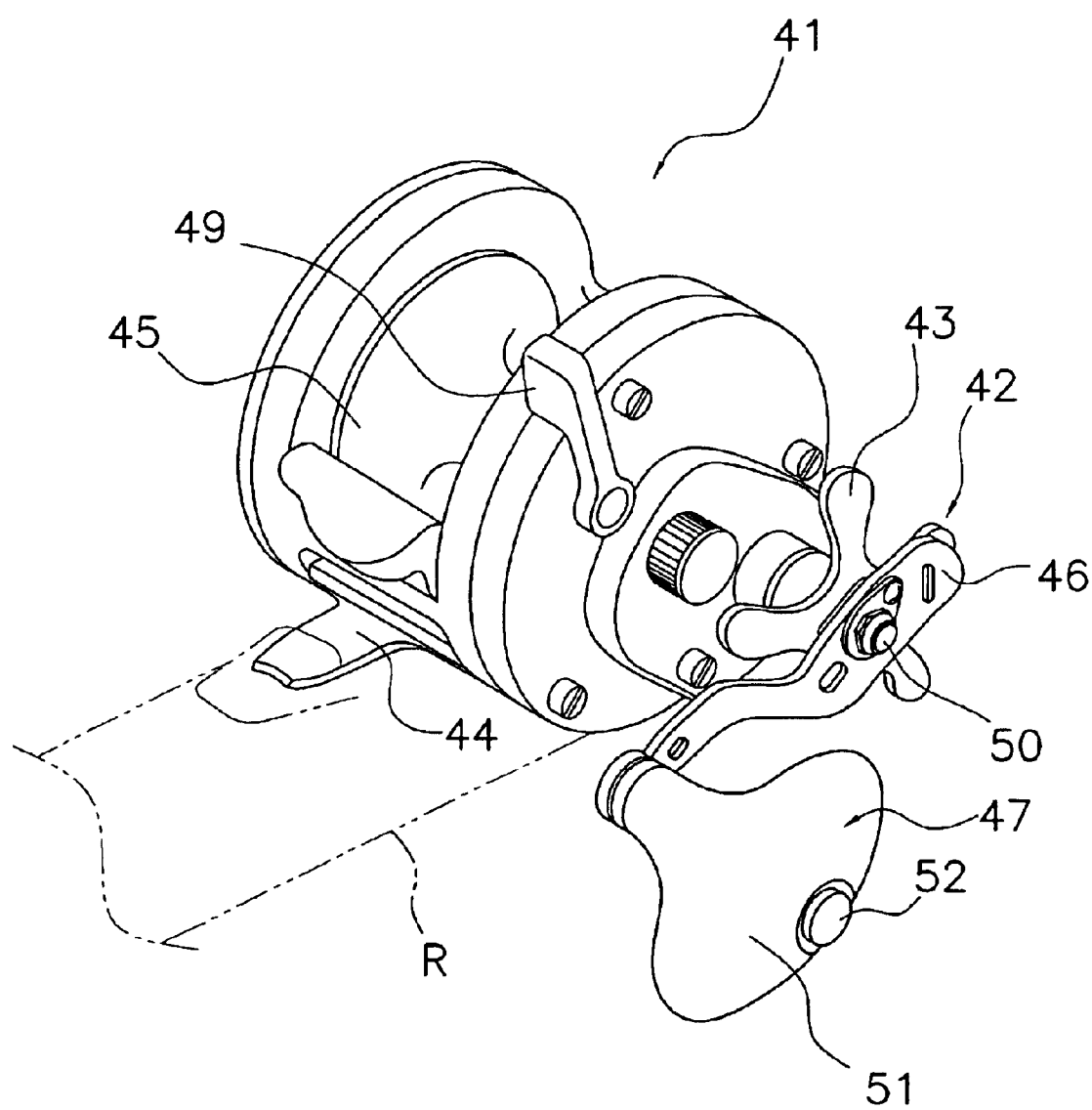
FIG. 8 is a perspective view of a dual-bearing reel in which a fourth embodiment of the present invention is adopted.
Figure 9:
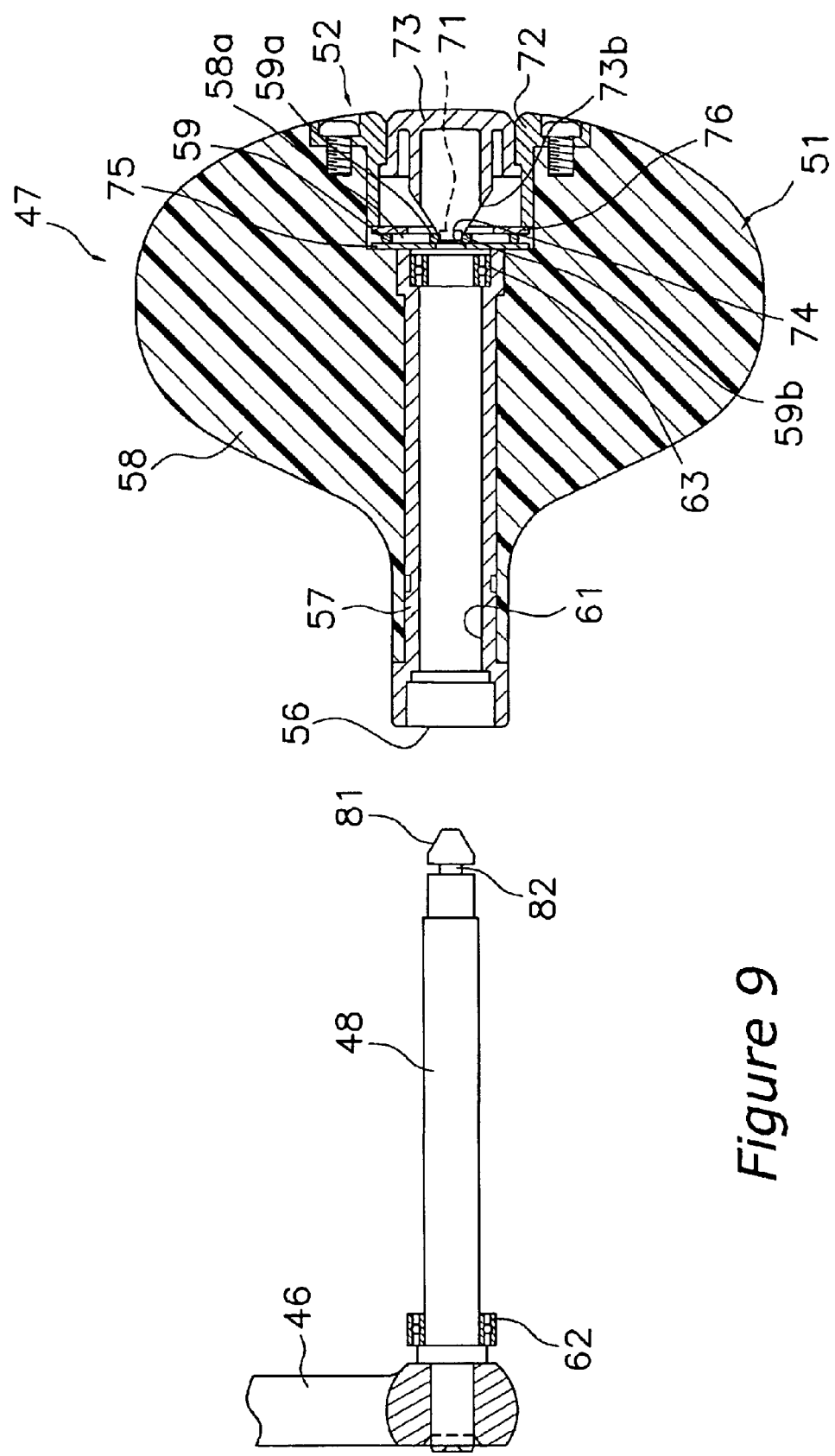
FIG. 9 is an exploded cross-sectional view of a handle assembly shown in FIG. 8 in accordance with the fourth embodiment of the present invention.

A dual bearing reel in which another embodiment of the present invention is adopted is, as shown in FIGS. 8 and 9, a single handle type round reel that includes a reel unit 41, a handle assembly 42, and a star drag 43. The handle assembly 42 is disposed on one side of the reel unit 41 and serves to rotate a spool 45. The star drag 43 is disposed at the reel unit 41 side of the handle assembly 42.

The reel unit 41 is attached to a fishing rod R via a rod attachment leg 44. A spool 45 for winding or releasing fishing line is rotatably mounted to the reel unit 41. A clutch lever 49 is pivotably mounted on the rear portion of the reel unit 41, and serves to operate a clutch mechanism not shown in the figures.

As shown in FIGS. 8 and 9, the handle assembly 42 includes a handle arm 46, a handle knob 47, and a knob shaft 48. The handle arm 46 is non-rotatably mounted to an end of the handle shaft (not shown in the figures). The handle knob 47 is rotatably mounted to one end of the handle arm 46. More specifically, the handled knob 47 is mounted to the knob shaft 48, which is preferably made of metal and serves to mount rotatably the handle knob 47 to the handle arm 46.

The handle arm 46 is preferably a flat metal member that extends radially outward from the handle shafts. The handle arm 46 is non-rotatably engaged with the handle shaft, and is detachably coupled to the handle shaft by a fixing nut 50.

Referring to FIG. 9, the knob shaft 48 is disposed parallel to the handle shaft, and a base end of the knob shaft 48 is fixedly coupled to a end of the handle arm 46. A tip of the knob shaft 48 includes a semi-conically shaped tapered surface 81, and an annular engagement groove 82 formed on the handle arm 46 side in the outer periphery of an end portion of the tapered surface 81.

The handle knob 47 includes a knob unit 51 and one-touch detachment mechanism 52. The knob unit 51 includes a tubular support portion 57 and a knob 58. The tubular support portion 57 is mounted on the knob shaft 48 and has an opening 56 provided in one end thereof. The knob 58 is non-rotatably coupled to the outer peripheral side of the support portion 57. A mounting space 58a is formed in an end surface of the knob 58.

The one-touch detachment mechanism 52 includes an engagement spring 59, a positioning projection 71, a lid member 72, an operation button 73, an engagement hole 74, and two washers 75 and 76. The engagement spring 59 engages with the engagement groove 82 of the knob shaft 48. Further, the positioning projection 71 serves as a first determining means for positioning the rotational position of the engagement spring 59, and the engagement hole 74 serves as a second positioning means.

The support portion 57 is tubular in shape and is, for example, made of a synthetic resin or metal. A hole 61 in which the knob shaft 48 is mounted is formed in the inner peripheral side of the support portion 57. The hole 61 is a cylindrical through hole, and bearings 62 and 63 are respectively mounted in both ends thereof. Note that the bearing 62 disposed on the base end of the support portion 57 is fixed to the knob shaft 48, and the bearing 63 disposed on the tip side of the support portion 57 is fixed to the support portion 57.

The knob 58 is preferably made from a synthetic resin, and the diameter thereof on the outer peripheral side of the support portion 57 preferably becomes gradually smaller toward the opening 56 in the base end side of the handle knob 47. The tip of the knob 58 is presented from rotating relative to the outer periphery of the support portion 57. In this manner, the knob 58 is non-rotatably coupled to the support portion 57.

The engagement spring 59 is formed by bending of a resilient wire material, and an urging force of the engagement spring 59 is produced when the engagement spring 59 is deformed. The engagement spring 59 includes engagement portions 59a and 59b that are arranged opposite each other, and serve to engage the knob shaft 48.

The positioning projection 71 and the engagement hole 74 are formed on a washer 75 identical or substantially identical to the washer 237 shown in the third embodiment. In addition, a cut-out is formed in the washer 76. The positioning projection 71 is slightly longer than the thickness of the engagement spring 59, and is shorter that the combined thicknesses of the engagement spring 59 and the washer 76.

A lid member 72 is screwed to the knob 58, and prevents the engagement spring 59 and the operation button 73 from falling out. The operation button 73 has a structure identical or substantially identical to the operation button 33 of the first embodiment, and includes tapered portions 73b. A description of the structure which prevents members from falling out and the structure of the operation button 73 will be omitted as they are identical or substantially identical to those of the aforementioned embodiment.

In this type of handle assembly 42, the operation button 73 will be pushed when the handle knob 47 is to be detached. Then, the gap between the engagement portions 59a and 59b of the engagement spring 59 will widen, the engagement of the engagement portions 59a and 59b with the knob shaft 48 will be released, and the handle knob 47 can thereby be detached.

During the assembly of the handle knob 47, the washer 75 will be mounted, and the engagement portions 59a and 59b of the engagement spring 59 will be disposed such that the positioning projection 71 formed on the washer 75 projects through the engagement portions 59a and 59b. Then, the operation button 73 will be mounted after the washer 76 is mounted. When this occurs, the tapered portions 73b formed on the operation button 73 are reliably inserted inside the engagement portions 59a and 59b by the engagement hole 74. Given this structure, errors in the assembly of the handle assembly 42 can be prevented.

Additionally, the present invention can be applied in a one-touch spool of a single bearing reel.

According to the present invention, an operation member and an engagement spring can only be mounted in a mounting space with the rotational position of the engagement spring being positioned by the first positioning means, and the rotational position of the operation member being determined such that the tapered portions are disposed between the engagement portions. Due to the structure, errors in the assembly of the operation member with the engagement spring can be prevented.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-351542. The entire disclosure of Japanese Patent Application No. 2002-351542 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A one-touch detachable fishing reel component for use in a fishing reel that has a shaft member having a tapered shaft surface formed on a tip of the shaft member, and an annular groove formed adjacent to the tapered shaft surface, said one-touch detachable fishing reel component comprising:
   a component unit having
      a pass through portion, the shaft member being adapted to extend therethrough, and
      a circular mounting space being formed in a front surface of said component unit, said circular mounting space being concentric with said pass through portion;
   an engagement spring made of a resilient wire member and being mounted in said mounting space, said engagement spring including
      a pair of engagement portions disposed opposite each other and adapted to engage with the annular groove, and
      a C-shaped connecting portion connecting one end of one of said engagement portions to one end of the other of said engagement portions;
   first positioning means for determining a rotational position of said engagement spring relative to said component unit within said circular mounting space, said first positioning means being disposed in said mounting space;
   a lid member configured to be fixedly coupled to said component unit, said lid member covering said mounting space and retaining said engagement spring therein;
   an operation member configured to be mounted on said lid member so as to be axially movable relative to said lid member and be able to pass over the annular groove, said operation member including
      a push operation portion being exposed to an exterior, and
      a pair of tapered portions projecting from said push operation portion in a direction opposite the exterior, tips of said pair of tapered portions being configured to be inserted between said engagement portions, said pair of tapered portions being adapted to be disposed in said mounting space with the shaft member interposed therebetween, a gap between said pair of engagement portions being configured to widen as said tapered portions are inserted between said engagement portions to release the engagement between the annular groove and said engagement spring; and
   second positioning means for controlling a rotational position of said operation member relative to said engagement spring.

2. The one-touch detachable fishing reel component according to claim 1, wherein
   said tapered portions of said operation member have a tapered surface on its outer peripheral surface and an inner diameter that is larger than a diameter of the shaft member.

3. The one-touch detachable fishing reel component according to claim 1, wherein
   said first positioning means includes a positioning projection that is provided on said front surface of said component unit and within said mounting space, said positioning projection being configured to be disposed between said engagement portions of said engagement spring.

4. The one-touch detachable fishing reel component according to claim 1, wherein said second positioning means includes a non-circular engagement hole including
   a pair of arc-shaped portions having inner diameters larger than an outer diameter of said tapered portions and configured to be disposed adjacent to said tapered portions, and
   a pair of connecting portions connecting both ends of said arc-shaped portions and being spaced apart from each other with a gap therebetween being smaller than the outer diameter of said tapered portions.

5. The one-touch detachable fishing reel component according to claim 4, wherein said engagement hole is formed within said mounting space on said front surface of said component unit.

6. The one-touch detachable fishing reel component according to claim 4, further comprising a washer member configured to be mounted between a bottom portion of said mounting space and said engagement spring.

7. The one-touch detachable fishing reel component according to claim 6, wherein said engagement hole is formed in said washer member.

8. The one-touch detachable fishing reel component according to claim 7, wherein said washer member has a cut-out portion formed on one of said arc-shape portions, such that said first positioning means passes through said cut-out portion.

9. The one-touch detachable fishing reel component according to claim 6, wherein said first positioning means includes a positioning projection that is formed on said washer member and configured to be disposed between said engagement portions of said engagement spring.

10. The one-touch detachable fishing reel component according to claim 1, wherein the shaft member is a spool shaft that is mounted on a reel unit of a spinning reel so as to be movable forward and backward, and said component unit is a spool unit of the spinning reel and is detachably and non-rotatably mounted to the spool shaft, around an outer periphery of said spool unit fishing line being configured to be wound.

11. The one-touch detachable fishing reel component according to claim 1, wherein the shaft member is a knob shaft that is fixedly coupled to a tip of a handle arm of a dual bearing reel, and said component unit is a knob unit that is rotatably and detachably mounted to a handle shaft.

12. A spinning reel, comprising:

a reel unit having a handle;

a rotor rotatably supported on a front portion of said reel unit;

a spool disposed on a front portion of said rotor and reciprocally movable forward and backward along a spool shaft, said spool shaft having a tapered shaft surface formed on a tip of said spool shalt, and an annular groove fanned adjacent to said tapered shaft surface, said spool having a spool unit detachably and non-rotatably mounted to said spool shalt, around an outer periphery of said spool unit fishing line being configured to be wound, said spool unit having a pass through portion, said spool shaft being designed to extend therethrough, and a circular mounting space being formed in a front surface of said spool unit, said circular mounting space being concentric with said pass through portion;

an engagement spring made of a resilient wire member and being mounted in said mounting space, said engagement spring including
   a pair of engagement portions disposed opposite each other and adapted to engage with said annular groove, and
   a C-shaped connecting portion connecting one end of one of said engagement portions to one end of the other of said engagement portions;

first positioning means for determining a rotational position of said engagement spring relative to said spool unit within said circular mounting space, said first positioning means being disposed in said mounting space;

a lid member configured to be fixedly coupled to said spool unit, said lid member covering said mounting space and retaining said engagement spring therein;

an operation member configured to be mounted on said lid member so as to be axially movable relative to said lid member and be able to pass over said annular groove, said operation member including
   a push operation portion being exposed to an exterior, and
   a pair of tapered portions projecting from said push operation portion in a direction opposite the exterior, tips of said pair of tapered portions being configured to be inserted between said engagement portions, said pair of tapered portions being adapted to be disposed in said mounting space with said spool shaft interposed therebetween, a gap between said pair of engagement portions being configured to widen as said tapered portions are inserted between said engagement portions to release the engagement between said annular groove and said engagement spring; and second positioning means for controlling a rotational position of said operation member relative to said engagement spring.

13. The spinning spool according to claim 12, wherein said tapered portions of said operation member have a tapered surface on its outer peripheral surface and an inner diameter that is larger than a diameter of the shaft member.

14. The spinning spool according to claim 12, wherein said first positioning means includes a positioning projection that is provided on said front surface of said spool unit and within said mounting space, said positioning projection being configured to be disposed between said engagement portions of said engagement spring.

15. The spinning spool according to claim 12, wherein said second positioning means includes a non-circular engagement hole including
   a pair of arc-shaped portions having inner diameters larger than an outer diameter of said tapered portions and configured to be disposed adjacent to said tapered portions, and
   a pair of connecting portions connecting both ends of said arc-shaped portions and being spaced apart from each other with a gap therebetween being smaller than the outer diameter of said tapered portions.

16. The spinning reel according to claim 15, wherein said engagement hole is formed within said mounting space on said front surface of said spool unit.

17. The spinning reel according to claim 15, further comprising
    a washer member configured to be mounted between a bottom portion of said mounting space and said engagement spring.

18. The spinning reel according to claim 17, wherein
    said engagement hole is formed in said washer member.

19. The one-touch detachable fishing reel component according to claim 18, wherein
    said washer member has a cut-out portion formed on one of said arc-shape portions, such that said first positioning means passes through said cut-out portion.

20. The spinning reel according to claim 17, wherein
    said first positioning means includes a positioning projection that is formed on said washer member and configured to be disposed between said engagement portions of said engagement spring.

* * * * *